US007061967B2

(12) United States Patent
Schelm et al.

(10) Patent No.: US 7,061,967 B2
(45) Date of Patent: Jun. 13, 2006

(54) MULTIPATH CHANNEL TAP DELAY ESTIMATION IN A CDMA SPREAD SPECTRUM RECEIVER

(75) Inventors: Jacob Schelm, Pardes Hanna (IL); Ophir Shabtay, Haifa (IL); Yaniv Avital, Jerusalem (IL); Ehud Reshef, Qiryat Tivon (IL)

(73) Assignee: Comsys Communication & Signal Processing Ltd., Herzelia (IL)

( * ) Notice: Subject to any disclaimer, the term of this patent is extended or adjusted under 35 U.S.C. 154(b) by 707 days.

(21) Appl. No.: 10/179,645

(22) Filed: Jun. 24, 2002

(65) Prior Publication Data

US 2003/0235238 A1 Dec. 25, 2003

(51) Int. Cl.
*H04B 1/707* (2006.01)

(52) U.S. Cl. ............... 375/147; 375/150; 370/335; 370/342

(58) Field of Classification Search ........ 375/147, 375/148, 150, 152, 132; 370/335, 342
See application file for complete search history.

(56) References Cited

U.S. PATENT DOCUMENTS

| 5,237,586 | A | 8/1993 | Bottomley | 370/206 |
|---|---|---|---|---|
| 5,305,349 | A | 4/1994 | Dent | 370/209 |
| 5,648,983 | A | 7/1997 | Kostic et al. | 375/150 |
| 5,914,949 | A | 6/1999 | Li | 370/342 |
| 5,917,851 | A | 6/1999 | Jarvela et al. | 375/148 |
| 5,978,423 | A | 11/1999 | Farjh | 375/347 |
| 6,026,115 | A | 2/2000 | Higashi et al. | 375/148 |
| 6,072,807 | A | 6/2000 | Daudelin | 370/465 |
| 6,078,611 | A | 6/2000 | Larosa et al. | 375/147 |
| 6,154,443 | A | 11/2000 | Huang et al. | 370/210 |
| 6,173,008 | B1 | 1/2001 | Lee | 375/148 |
| 6,192,066 | B1 | 2/2001 | Asanuma | 375/130 |
| 6,215,814 | B1 | 4/2001 | Ylitalo et al. | 375/148 |
| 6,269,075 | B1 | 7/2001 | Tran | 370/206 |
| 6,278,725 | B1 | 8/2001 | Rouphael et al. | 375/148 |
| 6,317,454 | B1 | 11/2001 | Mamori | 375/147 |
| 6,463,450 | B1 | 10/2002 | Balachandran et al. | 708/300 |
| 6,560,273 | B1 * | 5/2003 | Sourour et al. | 375/148 |
| 6,813,262 | B1 * | 11/2004 | Lee et al. | 370/342 |

OTHER PUBLICATIONS

Pan, "Base Station Baseband Digital Processing In Next Generation CDMA Systems", Master of Science Thesis, Dept of Elect. and Computer Engineering, Queen's University, kingston, Ontario, Canada, Nov. 1999.

(Continued)

*Primary Examiner*—Temesghen Ghebretinsae
(74) *Attorney, Agent, or Firm*—Zaretsky & Associates PC; Howard Zaretsky

(57) ABSTRACT

A method and apparatus for estimating channel tap delays of multipath components in a CDMA received signal. The search for the tap delays are split into two phases namely, a phase 1 and a phase 2 search. The phase 1 search is a coarse resolution quick search adapted to generate a rough estimate of the location of the tap delays. During this phase, the candidate codes are summed and the input signal correlated with the code sum creating an ambiguity in the code associated with the multipath. A finer resolution slower phase 2 search resolves the code ambiguity present in the initial rough estimates of the phase 1 search. Additional phase 2 correlations may be performed to implement a code-tracking loop.

66 Claims, 8 Drawing Sheets

OTHER PUBLICATIONS

Fock et al., "Exploring the UNTS WCDMA-Receiver Design Space Using a Semianalytical Approach", GLOBECOM'99, Rio De Janeiro, Dec. 1999.

Lohan, "Channel Estimation in Spread Spectrum Systems", Tampere University of Technology, Telecommunications Laboratory, Apr. 14, 2000.

Avital et al., U.S. Appl. No. 10/050,968, filed Jan. 22, 2002, entitled "Reduced Complexity Correlator for Use in a Code Division Multiple Access Spread Spectrum Receiver".

Pan, L. Y., Base Station Baseband Digital Processing in Next Generation CDMA Systems, Queen's University, Ontario, Canada, pp. 69-102, Nov. 1999.

Lohan, S., Chapter 12: Channel Estimation in Spread Spectrum Systems, Tampere University of Technology, Finland, pp. 1-6, Apr. 14, 2000.

* cited by examiner

MULTIPATH CHANNEL TAP DELAY ESTIMATION IN A CDMA SPREAD SPECTRUM RECEIVER

FIELD OF THE INVENTION

The present invention relates generally to cellular communication systems and more particularly relates to an apparatus for and method of multipath channel tap delay estimation and code tracking in a CDMA spread spectrum receiver.

BACKGROUND OF THE INVENTION

Currently, the demand worldwide for wireless services is growing at an ever quickening pace. The demand is not only for an increased number of users but also for extended wireless access capabilities. These capabilities include for example, Internal access, video conferencing and multimedia applications.

Code Division Multiple Access (CDMA) and Wideband-CDMA (W-CDMA) are spread spectrum based broadband communications technologies that are increasingly being used in mobile wireless communication systems and, in particular, for third generation (3G) mobile systems currently under development. In a CDMA system, multiple users simultaneously occupy the same frequency band. In contrast, each user in a Frequency Division Multiple Access (FDMA) system is assigned a separate frequency. Users in Time Division Multiple Access (TDMA) systems are assigned separate predefined time slots. CDMA systems, however, discriminate between users by using different codes for each user. In the downlink, CDMA base stations simultaneously transmit signals to multiple subscriber mobile stations over a single frequency band whereby each signal is generated using a different code associated with each user. Several advantages of CDMA systems over other multiple access systems such as FDMA and TDMA systems include greatly increased spectral efficiently and the ability to reduce the affects of signal fading by making use of known path diversity techniques.

In a W-CDMA base station, each information signal associated with a mobile station is multiplied by a unique spreading code sequence. The spreading code sequence is formed by concatenating (i.e. multiplying) a particular scrambling code together with a channelization code unique to each mobile station. Note that in W-CDMA, relatively long scrambling codes (38,400 chips) are concatenated with short channelization codes resulting in the spreading code used to modulate the information traffic. Examples of long codes include complex or non-complex PN sequences, for example Gold sequences or maximal length sequences. Examples of short codes include Orthogonal Variable Spreading Factor (OVSF), Walsh or Hadamard codes. Multiplication of the information signal by the spreading code sequence creates the spreading of the signal spectrum by the ratio of the chip rate to the symbol rate. The spread signals for all users are transmitted simultaneously by the base station.

A W-CDMA signal is de-spread by correlating the received signal with the known spreading sequence. The results are adequate as long as the influence of other users can be neglected. The influence between users is reduced by choosing the spreading codes so that the cross correlation between different codes and multipath delays is low (e.g., Gold, OVSF codes).

At each mobile station, a receiver de-spreads the received signal by multiplying the received signal by the code sequence assigned to the receiver. The de-spreading is accomplished using a correlator which functions to generate the information signal intended for the particular mobile station. The correlator operation is such that signals encoded with other user's codes intended for other mobile stations appear at the output of the correlator as minimal noise.

The structure and operation of spread spectrum and CDMA systems are well known. See, for example, Robert C. Dixon, "Spread Spectrum Systems," John Wiley & Sons, 1984, Andrew J. Viterbi, "CDMA: Principles of Spread Spectrum Communication," Addison-Wesley Publishing, 1995 and Roger L. Peterson, Rodger E. Ziemer, and David E. Borth, "Introduction to Spread Spectrum Communications," Prentice-Hall, 1995.

The use of W-CDMA has been proposed for applications requiring higher bandwidth such as multimedia applications. W-CDMA achieves higher data rates by using higher chip rates for the spreading waveform resulting in a higher information rate. Considering that the main interference in a CDMA system is from other users, the increased spreading factor or processing gain allows for improved handling of higher interference levels, which translates to a higher number of users that can be supported in the same cell. In addition, the reduced chip period results in more multipath components being separated by at least one chip period, making more paths available to be resolved by the receiver.

In CDMA systems, rake receivers are typically employed to combat multipath interference. A rake receiver exploits the path diversity present in the input RF signal. The transmitted signal typically travels to the receiver over a channel that includes many independent paths or multipath components. Each multipath component represents a separate route the signal took in traveling from the transmitter to the receiver. A plurality of multipath signals arrive at the receiver with each multipath having a different delay, phase and signal strength due to the fading present in the channel.

Narrowband multiple access techniques such as FDMA and TDMA cannot discriminate between the individual multipath signals that arrive at the receiver because their symbol transmission times are too long, i.e. the symbol duration is relatively long making it impossible to discriminate between individual multipath components. Therefore, these systems must perform equalization in order to combat the negative effects of multipath interference. In CDMA systems, on the other hand, multipath has a minimal negative effect on performance while adding diversity.

The function of the rake receiver in a W-CDMA system is to discriminate between individual multipath signal components, demodulate them and combine them to produce a stronger output signal. Rake receivers typically comprise several 'fingers', which are allocated to different multipath components. Each finger is used to receive and demodulate a different multipath component. The energy received from each finger is combined resulting in a stronger received signal. A searcher functions to search for the strongest multipath components and assigns the fingers to those components.

One of the principle tasks of a CDMA receiver and particularly a 3G W-CDMA receiver is the estimation of channel tap delays of the multipath components comprising the input signal. To accomplish this the receiver searches for the channel tap delays associated with different multipath components, i.e. echoes. The search process may be divided into two activities namely (1) detection of new tap delays and (2) tracking of currently known tap delays.

Techniques of channel tap delay estimation are known in the art and typically comprise parallel correlator or serial search based algorithms. In these techniques, a correlator is configured with a set of parameters, including the identity of the code and the relative delay, and adapted to produce a correlation measure between the input signal and a locally reproduced replica thereof. The correlation value generated is used to indicate the existence of a channel tap corresponding to the tested set of parameters.

The channel tap delay estimation is typically performed by the searcher unit in the receiver. The searcher unit is considered the most computationally demanding unit in the receiver and consequently has a major influence on the receiver performance. Thus, an efficient search algorithm has the potential to substantially reduce the computational complexity of the receiver while increasing its performance.

For cellular CDMA systems that operate over a multipath fading channel the problem of estimating tap delays is compounded when considering the requirement of finding and estimating the received delay profile from multiple transmitters. This requirement is related to soft handover and hard handover. In hard handover, the mobile station performs signal reception and demodulation from a single, different, base station than the one(s) before the handover. In soft handover, the mobile station simultaneously performs reception and demodulation of several base stations. For example, both IS-95 and cdma2000 cellular systems utilize a single downlink scrambling code while UMTS W-CDMA utilizes multiple downlink scrambling codes due to an asynchronous network. Thus, there is a need in W-CDMA systems to search over multiple codes and delays that further complicate the search procedure the searcher must perform.

There is thus a need for an efficient search mechanism for performing channel tap delay estimation of the multipath components in an input signal having reduced computational complexity and that permits the receiver to maintain a high level of performance.

SUMMARY OF THE INVENTION

The present invention is a method and apparatus for estimating channel tap delays of multipath components in an input signal. The estimation mechanism of the present invention described herein separates the tap delay search into two phases, i.e. a phase 1 search and phase 2 search. In the phase 1 search, a rough, ambiguous estimate of the channel tap delays is calculated. After the rough phase 1 search, a finer resolution phase 2 search is performed to fine-tune the initial rough estimates.

During the phase 1 search, channel tap detection is performed in an ambiguous manner in that the search is performed over the search area using a coarse delay resolution such as a whole chip period. In addition, the phase 1 search does not perform correlations of the input signal with individual codes but rather with a sum of a plurality of codes, thereby greatly reducing the time to cover a given number of codes and delays to search over. Correlating against a code sum provides an ambiguous result as to the actual code associated with a particular detected multipath component. This ambiguity is resolved in the phase 2 search whereby the input signal is correlated with each possible code to determine the actual multipath code. In addition, the phase 2 search is performed over a finer delay resolution, e.g., ½ or ¼ chip delays rather than whole chip delays used in the phase 1 search.

The search algorithm can be adapted to not only detect the codes and delays of multipath components but also to track them on a periodic or continuous basis. Once a multipath component is resolved, it's delay and code can be tracked by performing a phase 2 search repeatedly wherein the phase timing of the early, on-time and late versions of the input signal are maintained such that the correlation results are centered around the on-time component.

The correlator of the present invention is especially suited for use in CDMA and W-CDMA spread spectrum communication systems. For example, the invention is useful in User Equipment (UE) required to support multi-channel reception. In this case, the receiver comprises a plurality of correlators that can be configured to perform the phase 1 and 2 searches. Note that the number of correlators is not necessarily equal to the number of channels. In addition, the estimation mechanism is adapted to provide tap delay estimates within a portion of a chip. This requires the estimation mechanism to have a sub-chip search resolution in order to reduce the estimate uncertainty to within $T_{CHIP}/M$ where M denotes the fine resolution of the fractional chip spacing.

Note that many aspects of the invention described herein may be constructed as software objects that execute in embedded devices as firmware, software objects that execute as part of a software application on either an embedded or non-embedded computer system running a real-time operating system such as WinCE, Symbian, OSE, Embedded LINUX, etc., or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the present invention a method of channel tap delay estimation of multipath components in an input signal for use in a spread spectrum communications system, the method comprising the steps of summing a plurality of codes to generate a code sum therefrom, determining the delay associated with one or more multipath components within the input signal by performing a first set of correlations of the code sum with the input signal and delayed versions thereof, determining the code associated with a multipath component by performing a second set of correlations of one or more delayed versions of the input signal with each of the plurality of codes, wherein one or more the delayed versions of the input signal are selected in accordance with the results of the first set of correlations and declaring the existence of a multipath component at a delay and code in accordance with the second correlation results.

There is also provided in accordance with the present invention a method of channel tap delay estimation of multipath components in an input signal for use in a spread spectrum communications system, the method comprising the steps of summing a plurality of codes to generate a code sum therefrom, performing a first set of correlations of the code sum with the input signal wherein the first set of correlations are performed over a delay search area, selecting one or more candidates from the first set of correlations based on a first criteria, for each candidate, performing a second set of correlations of the input signal with each code and declaring the existence of a multipath component channel tap at a delay and code from the results of the second set of correlations based on a second criteria.

There is further provided in accordance with the present invention a method of channel tap delay estimation of multipath components in an input signal for use in a spread spectrum communications system, the method comprising the steps of estimating the delays associate with a plurality of multipath components present in an input signal by performing a first set of correlations of the input signal and delayed versions thereof with the sum of N codes the results of which indicate the presence of a multipath component at a particular delay having one of the N codes, wherein N is a positive integer and resolving the code ambiguity in the results of the estimating step by performing a second set of correlations of the input signal at the estimated multipath delays found during the estimating step with each of the N codes individually.

There is also provided in accordance with the present invention an apparatus for estimating the channel tap delay of multipath components in an input signal for use in a spread spectrum communications system comprising code summing means for summing a plurality of N codes to generate a code sum therefrom, wherein N is a positive integer, first correlation means for determining the delay associated with one or more multipath components within the input signal by performing a first set of correlations of the code sum with the input signal and delayed versions thereof, second correlation means for determining the code associated with a multipath component by performing a second set of correlations of one or more delayed versions of the input signal with each of the N codes, wherein one or more the delayed versions of the input signal are selected in accordance with the results of the first set of correlations and control means operative to declare the existence of a multipath component at a delay and code in accordance with second correlation results.

There is still further provided in accordance with the present invention a method of channel tap delay estimation of multipath components in an input signal for use in a spread spectrum communications system, the method comprising the steps of providing a correlation machine adapted to perform a plurality of correlations of an input signal and delayed version thereof and one or more codes, determining delays associated with the multipath components by configuring the correlation machine to perform a first set of correlations of the input signal and delayed versions thereof with a sum of a plurality of codes so as to generate indications of the presence of a multipath component at a particular delay having an ambiguous code associated therewith, resolving the ambiguity of the code associated with a multipath component by configuring the correlation machine to perform a second set of correlations of the input signal delayed in accordance with a determined multipath delay with each and every code in the plurality of codes, whereby correlations exceeding a threshold indicate the particular code associated with a multipath component and tracking the multipath components by maintaining early, on-time and late correlations of the input signal with the code corresponding to the particular multipath component.

There is also provided in accordance with the present invention a rake receiver for use in a Code Division Multiple Access (CDMA) spread spectrum communications system comprising a radio frequency (RF) front end circuit for receiving a spread spectrum RF signal having a plurality of multipath components, a searcher adapted to estimate the channel tap delays associated with the multipath components of the RF signal and to generate one or more path selections in accordance thereto, the searcher comprising means adapted to sum a plurality of N codes to generate a code sum therefrom, wherein N is a positive integer, determine the delay associated with one or more multipath components within the input signal by performing a first set of correlations of the code sum with the input signal and delayed versions thereof, determine the code associated with a multipath component by performing a second set of correlations of one or more delayed versions of the input signal with each of the N codes, wherein one or more the delayed versions of the input signal are selected in accordance with the results of the first set of correlations, declare the existence of a multipath component at a delay and code in accordance with the second correlation results, a finger bank for generating a plurality of demodulated signals from the RF signal in accordance with the path selections, a channel estimation unit adapted to generate channel estimates of one or more pilot signals and a combiner coupled to the output of the collapsed finger bank and adapted to combine the demodulated signals output therefrom to generate a receive data output signal in accordance with the channel estimates.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
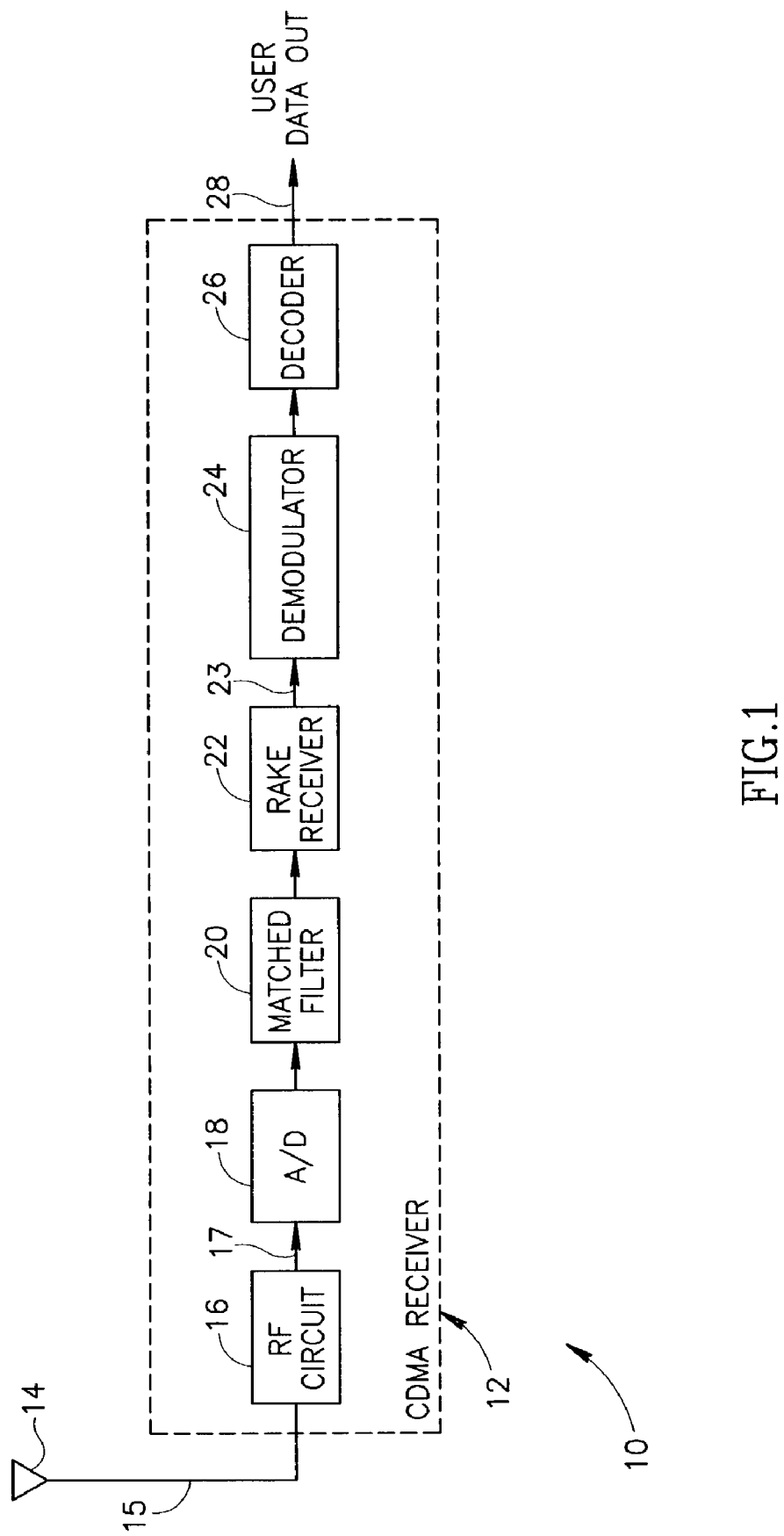
FIG. 1 is a block diagram illustrating an example CDMA downlink receiver employing a rake receiver.

The following notation is used throughout this document.

| Term | Definition |
| --- | --- |
| ASIC | Application Specific Integrated Circuit |
| BPF | Band Pass Filter |
| CDMA | Code Division Multiple Access |
| CRC | Cyclic Redundancy Code |
| FDMA | Frequency Division Multiple Access |
| FEC | Forward Error Correction |
| FPGA | Field Programmable Gate Array |

-continued

| Term | Definition |
| --- | --- |
| HDL | Hardware Description Language |
| IF | Intermediate Frequency |
| ISI | Inter Symbol Interference |
| MAI | Multiple Access Interference |
| MPI | Multipath Interference |
| MRC | Maximal Ratio Combining |
| OVSF | Orthogonal Variable Spreading Factor |
| PN | Pseudo random Noise |
| RF | Radio Frequency |
| SF | Spreading Factor |
| SIR | Signal to Interference Ratio |
| SNR | Signal to Noise Ratio |
| TDMA | Time Division Multiple Access |
| UE | User Equipment |
| UMTS | Universal Mobile Telecommunications System |
| W-CDMA | Wideband Code Division Multiple Access |

Detailed Description of the Invention

The present invention is a method and apparatus for estimating channel tap delays of multipath components in an input signal. The estimation mechanism of the present invention described herein separates the tap delay search into two phases, i.e. a phase 1 search and phase 2 search. In the phase 1 search, a rough estimate of the channel tap delays is calculated. After the rough phase 1 search, a finer resolution phase 2 search is performed to fine-tune the initial rough estimates. It is noted that a single apparatus could be implemented to enable the use thereof for either phase 1 search or phase 2 search as required.

During the phase 1 search, channel tap detection is performed in an ambiguous manner in that the search is performed over the search area using a coarse delay resolution of up to a whole chip period. In addition, the phase 1 search does not perform correlations of the input signal with individual codes but rather with a sum of a plurality of codes, thereby greatly reducing the time to cover a given number of codes and delays to search over. Correlating against a code sum provides an ambiguous result as to the actual code associated with the particular multipath component. This ambiguity is resolved in the phase 2 search whereby the input signal is correlated with each possible code to determine the actual multipath code. In addition, the phase 2 search is performed over a finer delay resolution, e.g., ½ or ¼ chip delays rather than whole chip delays used in the phase 1 search.

It is noted that the present invention is not limited to use with any particular code. Throughout this document, the invention is described in reference to W-CDMA codes but it is not limited to use with only these codes. The invention is applicable to any spread spectrum system including, for example, CDMA systems, time hopping systems and frequency hopping systems. Depending on the particular application and implementation, the invention is applicable for use with a multitude of types and varieties of codes including different phases of the same code. Examples include but are not limited to PN codes such as used in IS-95 and cdma2000, Gold sequences and complex Gold sequences used in W-CDMA, channelization codes, OVSF codes, Walsh or Hadamard codes, scrambling codes, etc.

In addition, the invention is not limited to use with the correlators described herein. The mechanism of the present invention may be constructed using any suitable correlator and configuration thereof. For example, the correlator functions may be performed in hardware or software. In the case of hardware correlators, the invention may be constructed using separate hardware for phase 1 and phase 2 correlations. Alternatively, the same correlator machine may be used whereby it is configured differently for phase 1 and phase 2 searches and for periodic code tracking purposes performed on an ongoing basis after initial detection of multipath components.

To aid in illustrating the principles of the present invention, the channel tap delay estimation mechanism is described incorporated in a search unit of a rake receiver in a CDMA spread spectrum communications system. Note that the invention is not limited to this communications system or configuration thereof, as one skilled in the communication arts can apply the tap delay estimation mechanism of the present invention to other communication systems, configurations and modulations without departing from the spirit and scope of the present invention.

The tap delay estimation mechanism of the present invention may be incorporated in a communications device such as a W-CDMA mobile receiver, W-CDMA base station receiver, etc. A block diagram illustrating an example W-CDMA downlink receiver employing a rake receiver is shown in FIG. 1. A W-CDMA receiver, generally referenced 10, for use in a W-CDMA communications system is shown. The receiver comprises an antenna element 14, an RF front-end circuit 16, an A/D converter 18, matched filter 20, rake receiver unit 22, demodulator 24 and FEC decoder 26.

In operation, antenna 14 receives a spread spectrum RF signal transmitted by one or more W-CDMA base stations (not shown). RF front-end circuit 16 receives the RF signal 15 from the antenna and processes it. Several functions are performed by the RF front-end circuit depending on the particular implementation. For example, typical functions include a first downconversion from RF to IF, band pass filtering (BPF) to reject out-of-band interference and noise, a second downconversion from IF to baseband including splitting the signal into in-phase and quadrature phase (i.e. I and Q) components and matched filtering to match the pulse shape of the transmitted signal. It is noted that subsequent processing is adapted to handle the I and Q (complex) output 17 of the RF front-end circuit. The Rx output signal is then converted to the digital domain by A/D converters 18.

The digitized receive signal output of the A/D converters are then passed through matched filter 20. The output of the matched filter is then input to the rake receiver which functions to de-spread the received signal using a plurality of fingers each containing one or more correlators. Fingers are allocated to different multipath components and the resultant plurality of output signals from the fingers are combined into a high quality signal 23. The output signal 23 is then demodulated 24 and decoded 26 to generate the user data output signal 28.

Figure 2:
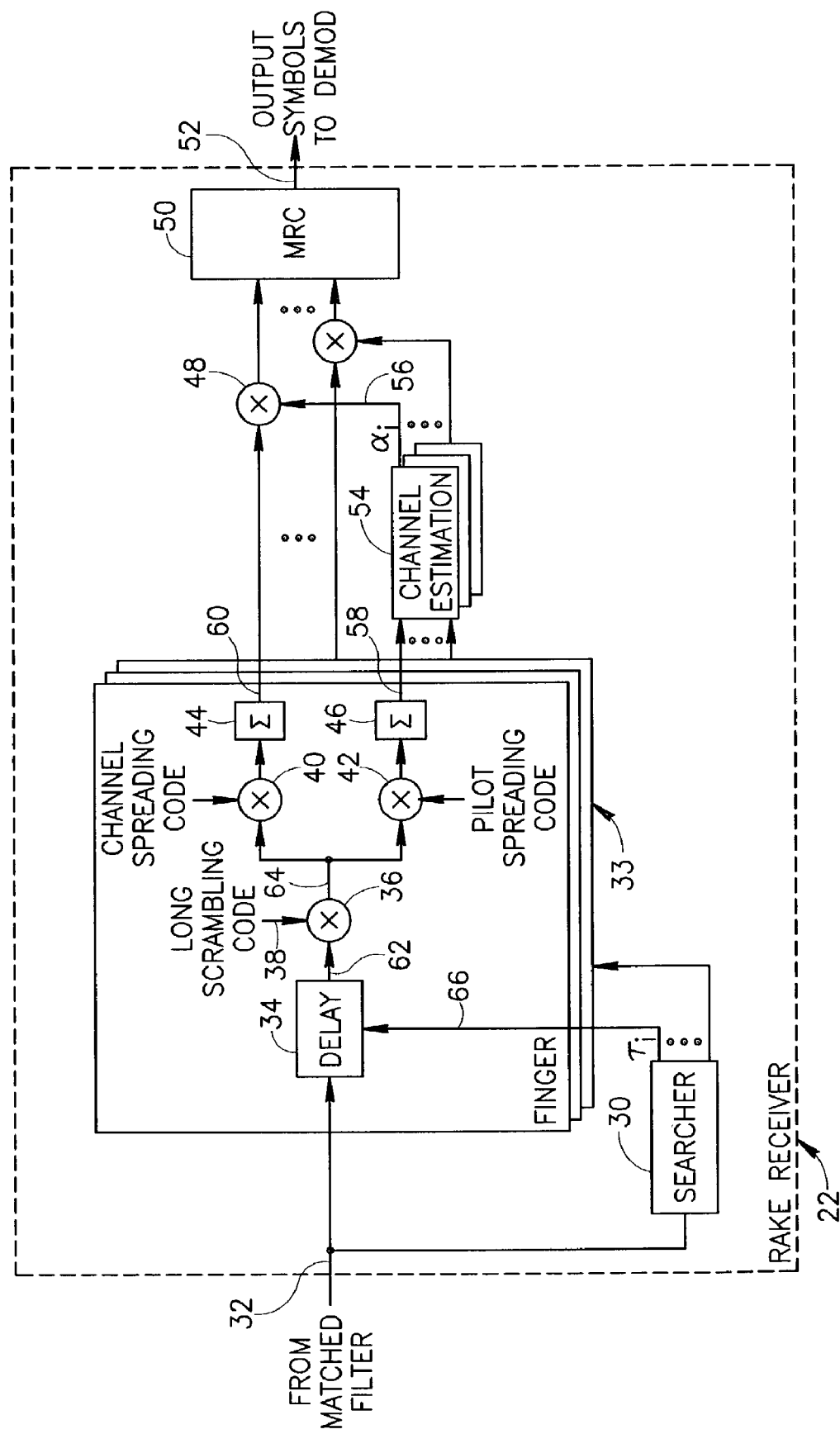
FIG. 2 is a block diagram illustrating the major components of the rake receiver of FIG. 1 in more detail.

A block diagram illustrating the major components of the rake receiver of FIG. 1 in more detail is shown in FIG. 2. The rake receiver comprises a finger bank 33, path selection unit or searcher 30 constructed using the tap delay estimation mechanism of the present invention, maximum ratio combiner (MRC) unit 50 and channel estimation unit 54. It is noted that although the W-CDMA receiver example presented herein is directed towards the receiver in the mobile unit, the principles of the present invention may be applied to other applications as well. The invention can be applied, for example, to the searcher in a W-CDMA base station receiver or to any other application that requires estimation of channel tap delays to be performed.

As discussed previously, the wide signal bandwidth (5 MHz in W-CDMA) provides robustness against fading (using frequency diversity), as the channel is unlikely to fade as a whole at any time instant. The high chip rate (3.84 MHz) provides a high temporal definition, which enables multipath resolution. A drawback of the larger bandwidth, however, is that the energy contained in any given multipath component is smaller, making the task of the rake receiver more difficult. The rake receiver typically must deal with several signal impairments all of which are time-varying, including multipath interference (MPI), multiple access interference (MAI—both inter and intra-cell), transmission path fading and the near-far effect due to the relative position of mobiles and base station.

The rake receiver combats these signal impairments by use of several techniques including channel estimation and tracking, maximum ratio combining to take advantage of multipath, multi-user detection schemes (e.g., interference cancellation or decorrelating receivers), fast power control based on signal-to-interference ratio (SIR) estimation and antenna diversity to provide another form of diversity (i.e. space-diversity) in addition to the temporal and frequency diversity.

In contrast to a TDMA system using linear equalization wherein the receiver attempts to compensate for multipath in the channel using equalization techniques to remove the inter-symbol interference (ISI) energy, CDMA systems use the energy contained in each echo to improve the signal-to-noise ratio (SNR). This can be done since the spreading codes on the downlink yield low correlation between the signal and its delayed versions. On the uplink, user separation is achieved through the use of different scrambling codes for each mobile. Each mobile can then use any OVSF code from the tree. The rake receiver functions to combine the energy contained in each of the multipath components. In the W-CDMA system, pilot bits are transmitted on dedicated channels, which allow channel estimation and coherent combining (i.e. maximum ratio combining) of the different paths. Typically, a rake receiver in a W-CDMA communication system comprises three to six rake fingers.

Each finger receives both in-phase and quadrature-phase signal components and is assigned to demodulate (i.e. de-spread) a separate multipath component of the RF signal. The rake receiver is adapted to comprise several fingers, which are referred to as the finger bank of the receiver. The assignment of the path selection is made by the searcher and input to the finger-bank. Each finger functions to sample the received signal for early, on-time and late components. The timing of the early and late samples is adjusted (i.e. advanced and delayed) relative to the timing of the on-time samples by a delay time. Note that alternatively, early and late signal components may or may not be acquired, depending on the implementation.

The fingers are represented by a finger bank 33. Each finger is a coherent receiver, which uses a reference pilot channel for coherent detection and estimation. The on-time samples comprise both traffic data and pilot channel samples. In accordance with W-CDMA, the pilot channel may comprise either reference symbols embedded within traffic symbols or a separate continuous pilot signal transmitted on a separate physical channel, i.e. code. Each finger is operative to de-spread the early, on-time and late signals by correlating them with suitable spreading code sequences generated by code generators.

The correlators function to multiply the samples by the spreading codes and to accumulate the results using integrators. Note that despreading the early and late signals is optional. If implemented, correlations for the early, on-time and late samples are obtained by adjusting the code to generate early, on-time and late code phases. This is equivalent to using the same code and using early, on-time and late receive samples.

In addition, a code-tracking loop may be used to generate an adjustment signal based on the difference between the early and late samples derived from the traffic or pilot channel. A channel tap is properly estimated when the difference between the early and late samples is substantially zero. The tracking adjustment signal is applied to track the timing of the multipath component being demodulated by the finger thus accounting for changes in the timing of the multipath which may be caused by relative motion between the transmitter and receiver or related scattering objects.

In operation, the receive signal input to the finger is delayed by a certain time via delay unit 34 in accordance with the delay $\tau_i$ 66 assigned by the searcher to the particular finger. Note that alternatively, the delays may be implemented via code generator initialization. The delayed received signal 62 is then multiplied by the long scrambling code 38 via multiplier 36. The product 64 is then split and multiplied by the channel spreading code via multiplier 40 and by the pilot spreading code via multiplier 42. The respective products are integrated via integrators 44, 46, respectively. Multiplication by the channel spreading code functions to de-spread the input signal and the integration results 60 from all the fingers are multiplied by a channel estimate a, 56 before being input to the maximum ratio combiner (MRC) 50. The MRC functions to combine the energies output of each finger to generate output symbols 52 therefrom. The pilot signal integration results 58 from each finger are used by the channel estimation units 54 in generating the channel estimates $\alpha_i$ 56 corresponding to each multipath component. The multipliers 48 function to perform match filtering of each multipath contribution in accordance with the individual channel estimates.

The de-spread pilot channel data is input to the channel estimation units 54 which function to periodically calculate an estimate of the channel. The channel estimates are used to match Filter the multipath components, which assists the MRC to optimally combine the data received from, the plurality of fingers. The accuracy of the channel estimate is most affected by MAI and noise, which degrades the signal to interference ratio (SIR).

The searcher 30 is operative to search out the different multipath components of the received signal transmitted using the code sequence assigned to the receiver. The timing of each finger is controlled such that it is correlated with a particular multipath found by the searcher and having a different delay. The searcher thus assigns each finger to a particular multipath by controlling its timing to coincide with the arrival of the multipath component.

The de-spread on-time symbols from the finger bank are time aligned and combined in a maximum ratio combiner (MRC) which functions to generate a high quality output signal. The output signal effectively collects the energy from all the multipath components, which were assigned to a finger. The output signal is then input to subsequent processing stages including a demodulator and decoder. The decoder is adapted to perform FEC decoding (e.g., Viterbi decoding, turbo decoding, CRC, etc.) of the received symbols and provide the user data output from the receiver.

Figure 3:
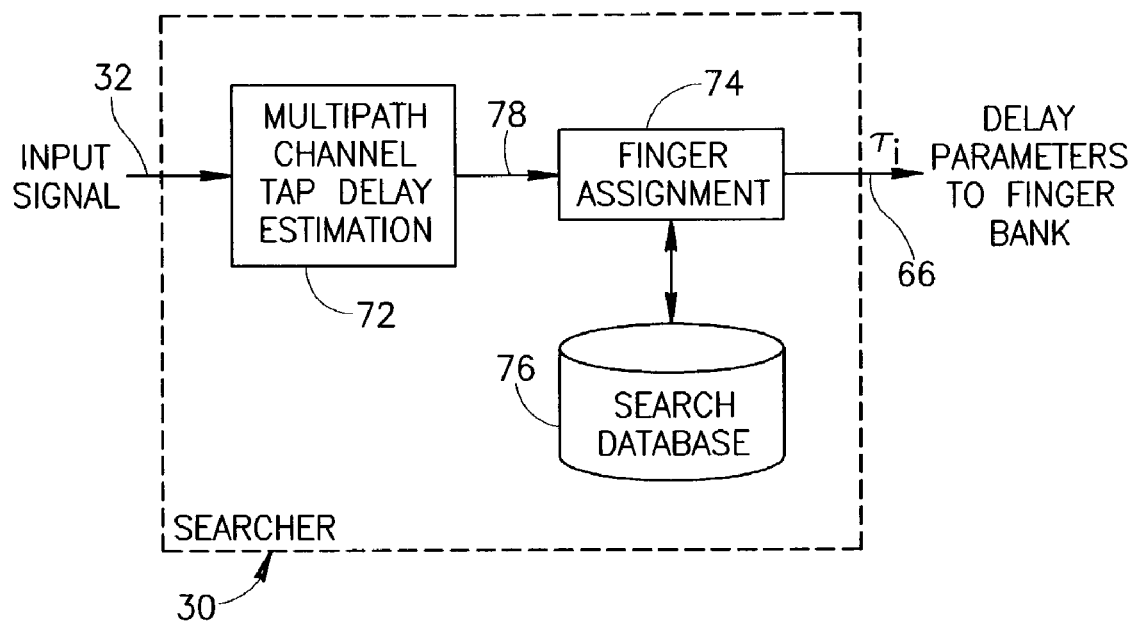
FIG. 3 is a block diagram illustrating the searcher unit of the rake receiver of FIG. 2 in more detail incorporating the multipath channel tap estimation unit of the present invention.

A block diagram illustrating the searcher unit of the rake receiver of FIG. 2 in more detail incorporating the multipath channel tap estimation unit of the present invention is shown in FIG. 3. The searcher 30 comprises a multipath channel tap delay estimation unit 72 constructed in accordance with the present invention, a finger assignment unit 74 and a search database 76.

In operation, the tap delay estimation unit receives the input signal 32 and is adapted to generate tap delay estimates of any multipath components present in the input signal. For each multipath component found, the tap delay estimates comprise both delay information and the code corresponding to the multipath. The estimate information 76 is stored in a search database and used by the finger assignment unit to generate the actual finger assignments. The allocation of a finger to a multipath component is accomplished by configuring the delay unit 34 (FIG. 2) in a finger with a particular delay parameter $\tau_i$ 66.

The finger allocation algorithm may be based on any suitable algorithm whereby the assignment is made as a function of the tap delay and power estimates. For example, the allocation may rely on the minimization of a cost function based on a history of the tap delay and power estimates stored in the search database.

Figure 4:
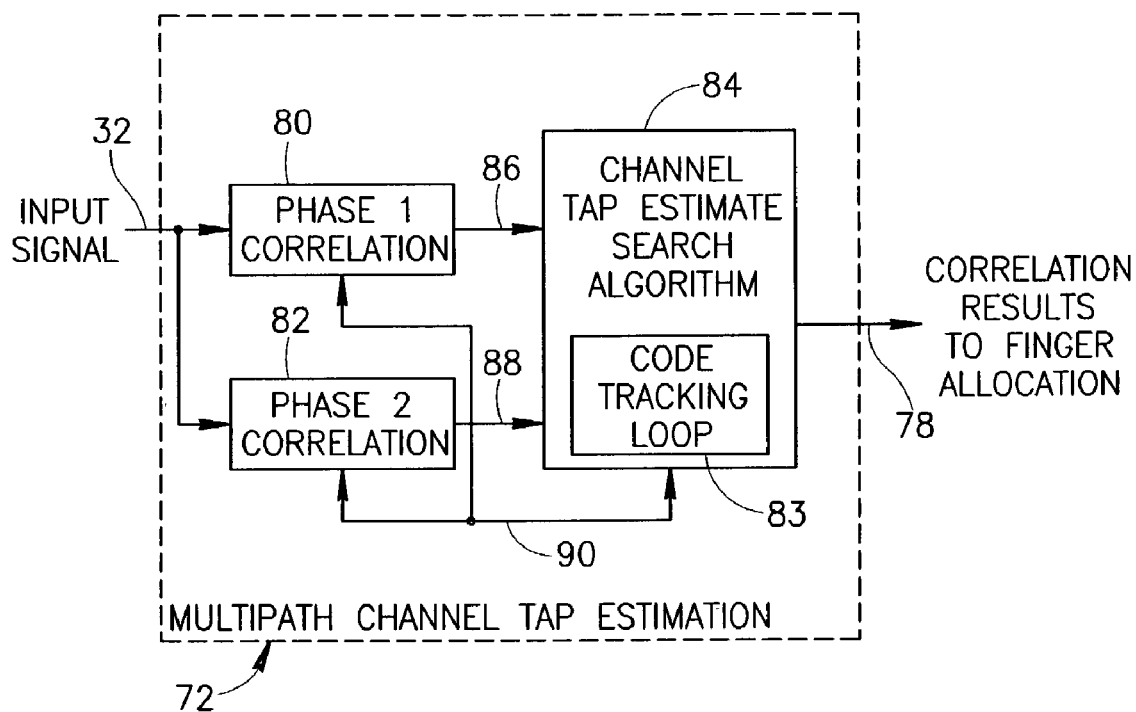
FIG. 4 is a block diagram illustrating an example embodiment of the multipath channel tap estimation unit of the present invention.

A block diagram illustrating an example embodiment of the multipath channel tap estimation unit of the present invention is shown in FIG. 4. The estimation unit, generally referenced 72, comprises a phase 1 correlation unit 80, phase 2 correlation unit 82 and a channel tap estimate search algorithm 84 comprising a code tracking loop 83. As described supra, the multipath search process is broken into two correlation phases. First, a rough estimate for the channel tap locations are determined during a set of phase 1 correlations. The initial rough estimates are then fine tuned in a set of phase 2 correlations to determine the tap delay locations with more precision and also to determine the particular code corresponding to the multipath. The outputs 86, 88 of the phase 1 and phase 2 correlations, respectively, are used by the search algorithm 84 in generating the correlation results 78 used in the assignment of the fingers to multipath components.

Considering the operation of the transmitter in a CDMA system, the transmitted signal $s_k$ can be expressed as $$s_k = a_{\lfloor \frac{k}{SF} \rfloor} c_k \tag{1}$$

where k is the discrete time index, $a_i$ is the $i^{th}$ transmitted symbol $$\left( i = \left\lfloor \frac{k}{SF} \right\rfloor \right)$$

means that the $i^{th}$ symbol remains constant over consecutive SF chips). SF is the spreading factor and $c_k$ denotes the spreading sequence $k^{th}$ chip. Due to the effects of multipath fading and reflections, multiple delayed versions of the transmitted signal arrive simultaneously at the receiver. Each delayed version of the signal can be expressed as $$s_{k-n} = a_{\lfloor \frac{k-n}{SF} \rfloor} c_{k-n} \tag{2}$$

where n is the phase delay of a discrete time equivalent multipath component. In order to recover transmitted symbols a, each of the delayed signal versions need to be de-spread. This operation can be expressed as $$\hat{a}_{\lfloor \frac{k}{SF} \rfloor} = \sum_{l=0}^{SF-1} \hat{s}_{SF \lfloor \frac{k}{SF} \rfloor + l} c^*_{SF \lfloor \frac{k}{SF} \rfloor + l} \tag{3}$$

where $\hat{s}$ represents the matched filter output, which is de-spread using $c^*$, $\hat{a}$ represents the estimated transmitted symbols, [ ]* denotes the complex conjugate operator and $c^*$ represents the complex conjugate spreading sequence used at the transmitter which is assumed to be known to the receiver.

Consider transmission over a channel with a discrete time equivalent (i.e. discrete time) impulse response as the following:

$$h_k = \sum_{i=1}^{L_h} \delta_{k-n_i} h_{n_i} \tag{4}$$

where $L_h$ is the number of the discrete time equivalent channel taps and $\delta_k$ is the discrete time impulse function, $h_{n_i}$ are the amplitudes of the $i^{th}$ discrete time equivalent channel tap and $n_i$ is the corresponding $i^{th}$ tap discrete time delay. Discrete time equivalents are commonly used to represent the effects of the channel in terms of sampling after a receiver matched filter. It is further stated that theoretically $L_h$ tends to infinity, however, in practice $L_h$ can be quite small due to rapid decay of $h_{n_i}$ out of a practical region of interest. See "Digital Communications Receivers, Synchronization, Channel Estimation and Signal Processing," Heinrich Meyr, Marc Moeneclaey and Stefan A. Fechtel, John Wiley & Sons, 1998.

Consider the received signal $r_k$ as the following $$r_k = \sum_{i=1}^{L_h} s_{k-i} h_i + v_k \tag{5}$$

where $v_k$ represents complex, zero mean, additive white Gaussian noise which may either represents the thermal noise or also the multiple access interference (MAI) or multipath interference (MPI) from non zero cross correlations.

Expressing the first term of Equation 3 in terms of the received signal yields the following expression $$\hat{a}_k = \sum_{l=0}^{SF-1} \left[ \sum_{i \in L_h} r_{k-n_i} \hat{h}^*_{n_i} \right] c^*_{SF \lfloor \frac{k}{SF} \rfloor + l} \tag{6}$$

where only a subset of the multipath components $L_h$ is assigned to RAKE 'fingers' and $\hat{h}_{n_i}$ are the channel estimates of the associated selected discrete time equivalent channel taps. The inner summation represents the outputs of the matched filter at the chip rate which must then be de-spread via the outer summation.

Considering the expression in Equation 6, from basic arithmetic properties, the order of the summations may be reversed and a mathematically equivalent expression for the symbol estimates may be written as follows:

$$\hat{a}_k = \sum_{i \in L_h} \left[ \sum_{l=0}^{SF-1} r_{k-n_i} \cdot c^*_{SF\lfloor \frac{k}{SF} \rfloor + l} \right] \hat{h}^*_{n_i} \quad (7)$$

The multipath signals are de-spread first and then matched filtered. Note that the matched filtering is now performed at the symbol rate rather than the chip rate as was the case in Equation 6. It is noted that the computational complexity of the expression for the symbol estimates of Equation 7 is less than that of Equation 6. Furthermore, the savings in the number of computations increase as the number of fingers increases.

Normally, in order to find the codes associated with multipath components, the received signal r must be correlated with all possible time shifts and scrambling sequences c (i.e. code sequences). Typically, the code space that must be searched is already narrowed down from all possible codes to a few codes by the network protocol in use in the system. The correlations must be made over all possible code candidates.

In accordance with the invention, the search time is reduced significantly by dividing the search process into two phases. In the first phase, the received signal is not correlated with each individual candidate code sequence. Denote the local reference sequence for correlation with the received signal by $c_k^\Sigma$ where all the candidate codes are summed (i.e.

$$c_k^\Sigma = \sum_{i=0}^{N-1} c_k^{(i)}$$

where N is the number of candidate code sequences and $c_k^{(i)}$ is the $i^{th}$ code sequence). In the first phase, the correlation is performed using this code sum rather than each individual code sequence. The existence of a multipath component in the input signal matching any of the codes within the code sum will generate a correlation result relative to the strength of the multipath component and to the length of the correlation plus a noise factor. The other codes within the sum appear as noise in the correlation result.

In addition, to further speed the initial search, a coarse resolution is used during the first phase correlations. For example, if the input signal is sampled at ¼ chip resolution, the first phase correlations are performed over the search area using whole chip resolution. For any arbitrary delay spread, the results of the phase 1 correlations comprise the locations of the multipath components at the coarse resolution, e.g., whole chip. The code, however, is ambiguous since at this stage it is not known which of the codes within the code sum corresponds to the relevant multipath component.

Figure 6:
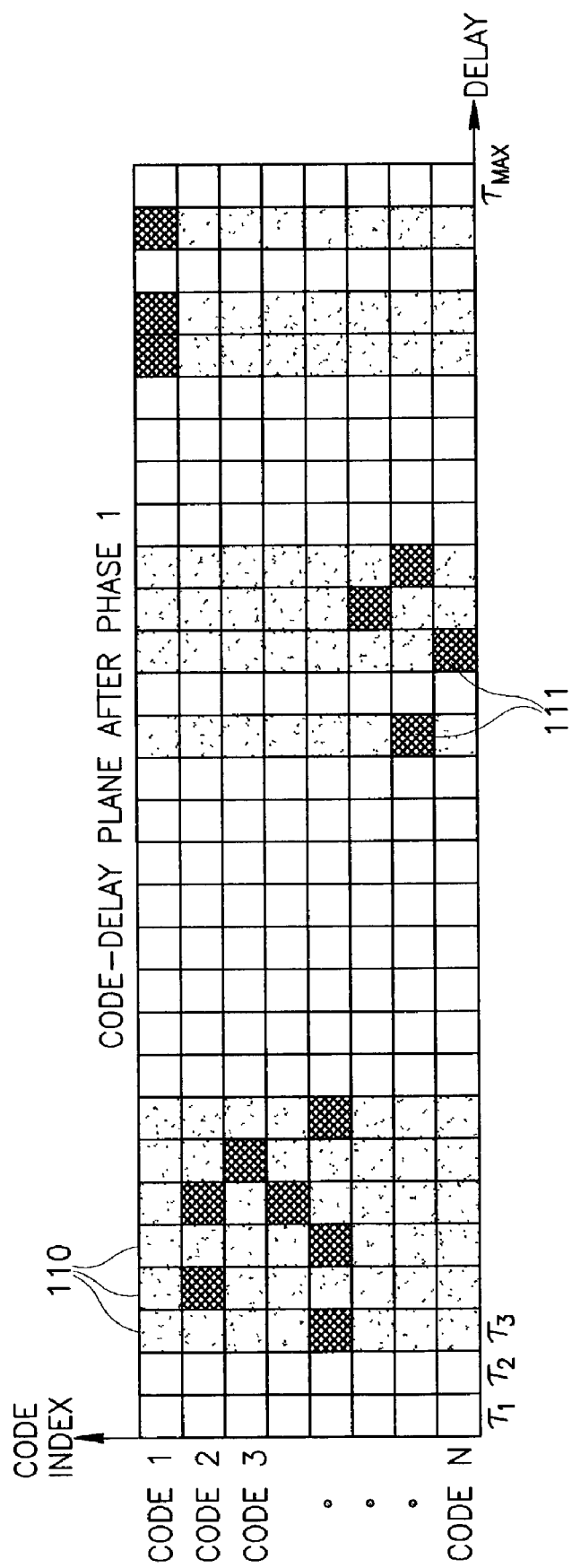
FIG. 6 is a diagram illustrating an example code-delay plane after the coarse or ambiguous correlation performed in phase 1 of the method of FIG. 5.

The results of the phase 1 coarse (i.e. ambiguous) correlations can be viewed on the code-delay plain as shown in FIG. 6 where correlation peaks are indicated by darkened columns 110. The x-axis represents the delay and extends from $\tau_I$ through $\tau_{MAX}$. The y-axis represents the candidate code sequences, code 1 through code N. The darkened squares 111 indicate the actual code associated with the multipath at that delay. Due to the ambiguous correlation with the code sum, however, the actual code is not known at this stage. During phase 2 the code ambiguity is resolved by correlating the input signal with each individual code.

Figure 5:
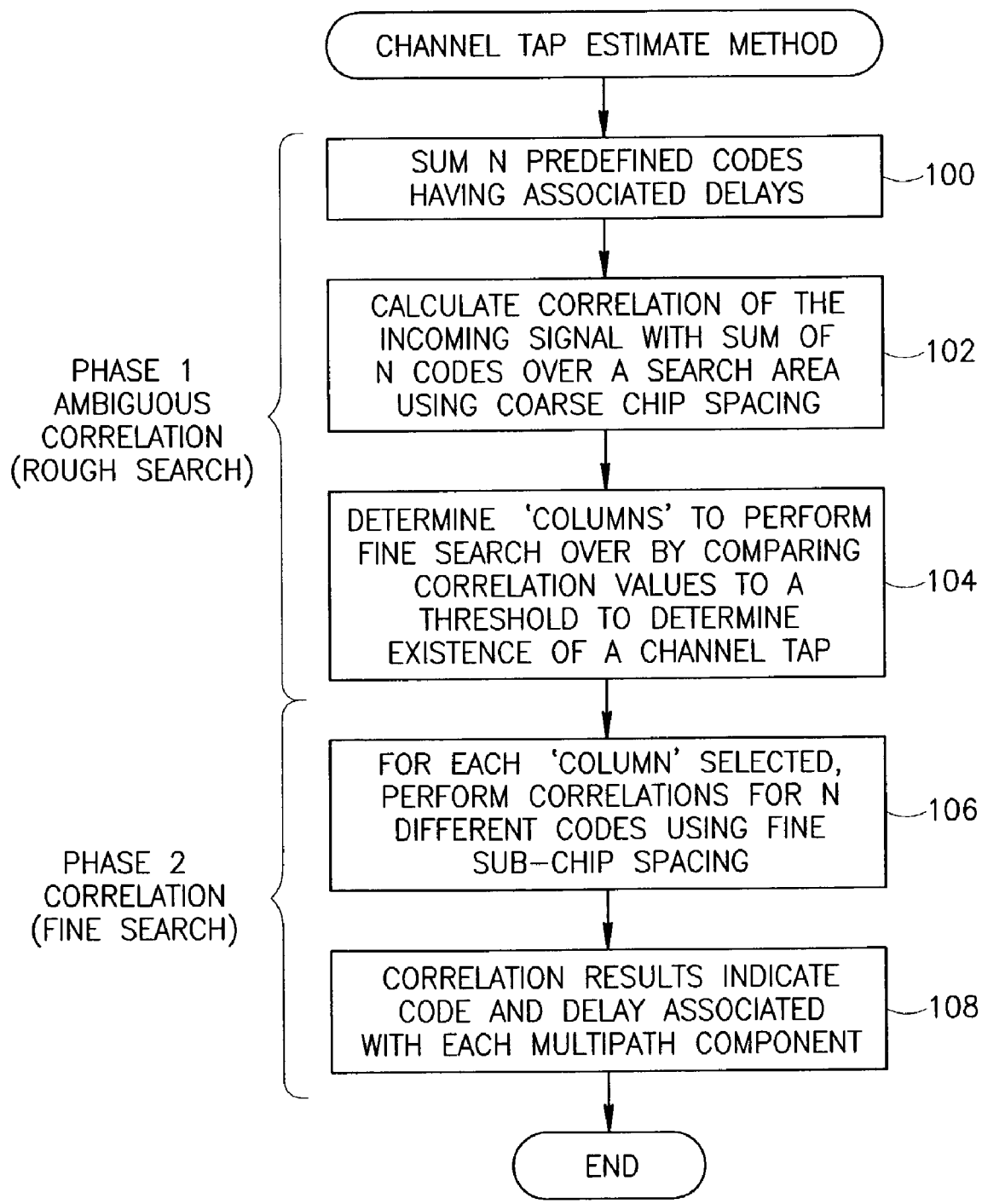
FIG. 5 is a flow chart illustrating the method of multipath component channel tap delay estimation of the present invention.

A flow chart illustrating the method of multipath component channel tap delay estimation of the present invention is shown in FIG. 5. First, a rough search for the initial tap delay estimates with ambiguous codes is performed followed by a fine search which resolves the code ambiguity and uses a finer delay resolution. Initially, all the candidate code sequences are summed (step 100). The codes may be any combination of different codes or the same codes with difference delays. The correlations are then performed of the input signal with the code sum over a search area using a relatively coarse resolution (step 102).

The correlations peaks yield a set of delay locations corresponding to the multipath components. The code associated with the multipath is ambiguous at this point and is resolved in the phase 2 correlations. A suitable algorithm is used to determine which locations are to be further refined in the next phase (step 104). Typically, the criterion to declare the existence of a channel tap comprises comparing the correlation values to a threshold. Those values that exceed the threshold are selected to be considered in the next phase. With reference to FIG. 5, each correlation result exceeding the threshold corresponds to a column at a particular delay. Note that the threshold may be determined in any suitable manner and in particular, for example, may be fixed, dynamic or adaptive in accordance with suitable criteria.

Alternatively, no threshold is used. In this case, a predefined number of candidate correlation values of phase 1 are selected by a predetermined selection algorithm, and transferred to phase 2. At the end of phase 2 processing, a fewer number of candidate values are selected. For example, ten candidate correlation values resulting from phase 1 processing are passed to phase 2 processing. After phase 2 processing, the best two candidates are selected as representing multipath component taps.

An advantage of the alternative tap selection technique described above is that no threshold determination and compare operations are required. For each pass through the tap delay estimation method, the number of candidate correlation values chosen after phase 1 is fixed. Although this technique may overlook actual multipath components and may pass non-real multipath components, performing the search repeatedly over time will retain the real components and may yield better performance than when using a threshold to select the candidates.

In another alternative embodiment, a hybrid combination of the two techniques described above arc utilized. In particular, a fixed number of candidate values from the results of phase 1, are passed to phase 2 while a threshold is applied to the results of phase 2.

For each location or 'column' selected, a second set of correlations is performed with the N individual codes making up the code sum calculated previously (step 106). The resolution used for this second set of correlations is finer than that of the first set in order to improve the delay estimate. Typically, the resolution is fractional chip spacing, for example, ¼ chip, and correlations performed over several adjacent delays. The results of the second set of correlations function to resolve the code ambiguity and provide the code and delay associated with each multipath component (step 108).

Figure 7:
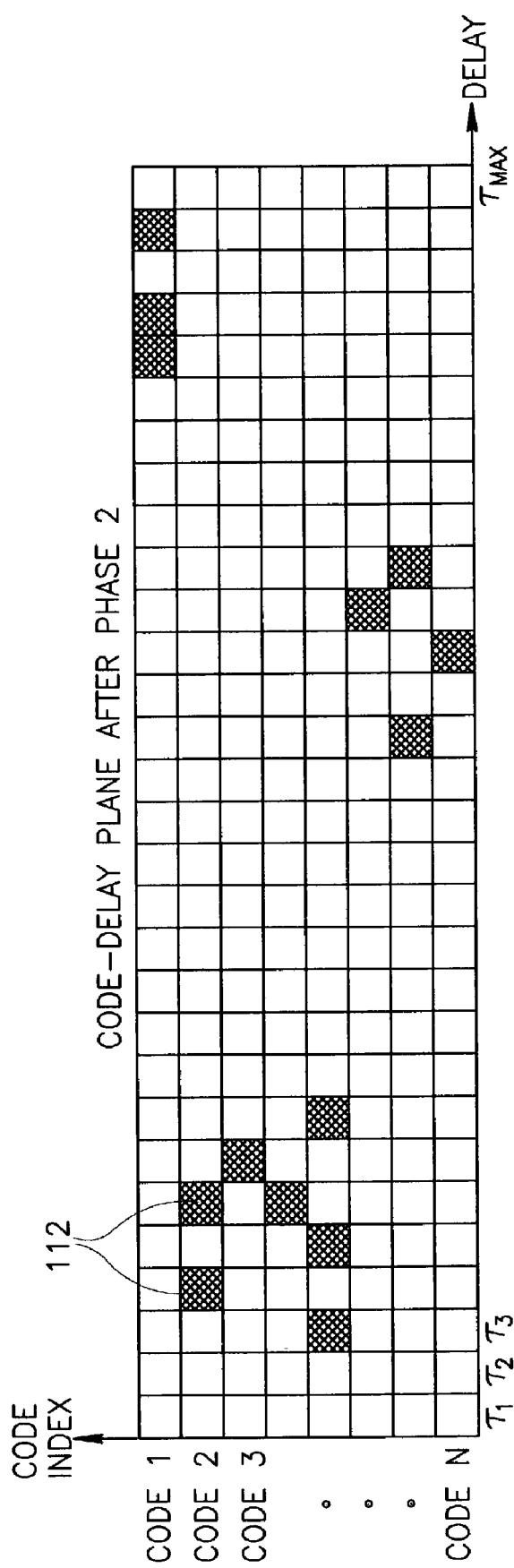
FIG. 7 is a diagram illustrating an example code-delay plane after the fine correlation performed in phase 2 of the method of FIG. 5.

The example code-delay plain after the fine correlation performed in phase 2 of the method is shown in FIG. 7. The darkened squares 112 indicate the particular code associated with a multipath at a certain delay. Note that the resolution of the x-axis is much finer than that of FIG. 6 wherein the delays are at fractional chip spacing, e.g., ¼ chip. The $T_{MAX}$ values in FIGS. 6 and 7 are thus not the same.

The problem of estimating the tap delays can be considered as performing a search over an uncertainty period $\Delta\tau = N \cdot M \cdot P$ chip fractions where N is the number of codes, M is the fractional chip spacing and P is the number of whole chip periods. To illustrate, consider a CDMA system with a 3.84 Mcps chip rate and a search, area 20 µs wide corresponding to approximately 80 chips. At a fractional chip spacing of ¼ (M=4) with 8 candidate codes (N=8), a total of 80×4 ×8=2560 correlations are required. Using the mechanism of the present invention, however, the number of correlations required is significantly reduced as described follow.

First, the 8 codes are summed to yield a code sum. The input signal is then correlated with this code sum through the search area at whole chip intervals. Thus, only 80 correlations are required. Assume, for example, 10 out of the 80 correlations exceed a threshold. In addition, assume that for each column, phase 2 correlations are performed over 4 adjacent delays. During phase 2, correlations are performed with each code. Thus, the number of phase 2 correlations required is 10×4×8=320 and the total combined correlations for phase 1 and 2 is only 400, resulting in a significant (85%) reduction in computational complexity. Note that the reduction in computation complexity increases as the number of candidate codes increases.

This hierarchical approach can be further utilized to first correlate the incoming signal with code sums at a coarse timing resolution (e.g., whole chip intervals)—phase 1, secondly to correlate the incoming signal with individual surviving code-time candidates at a second coarse timing resolution (e.g., whole chip intervals)—modified phase 2, and only then apply correlations at the final fine-timing resolution as defined for phase 2 above.

Phase 1 Correlation Unit

Figure 8:
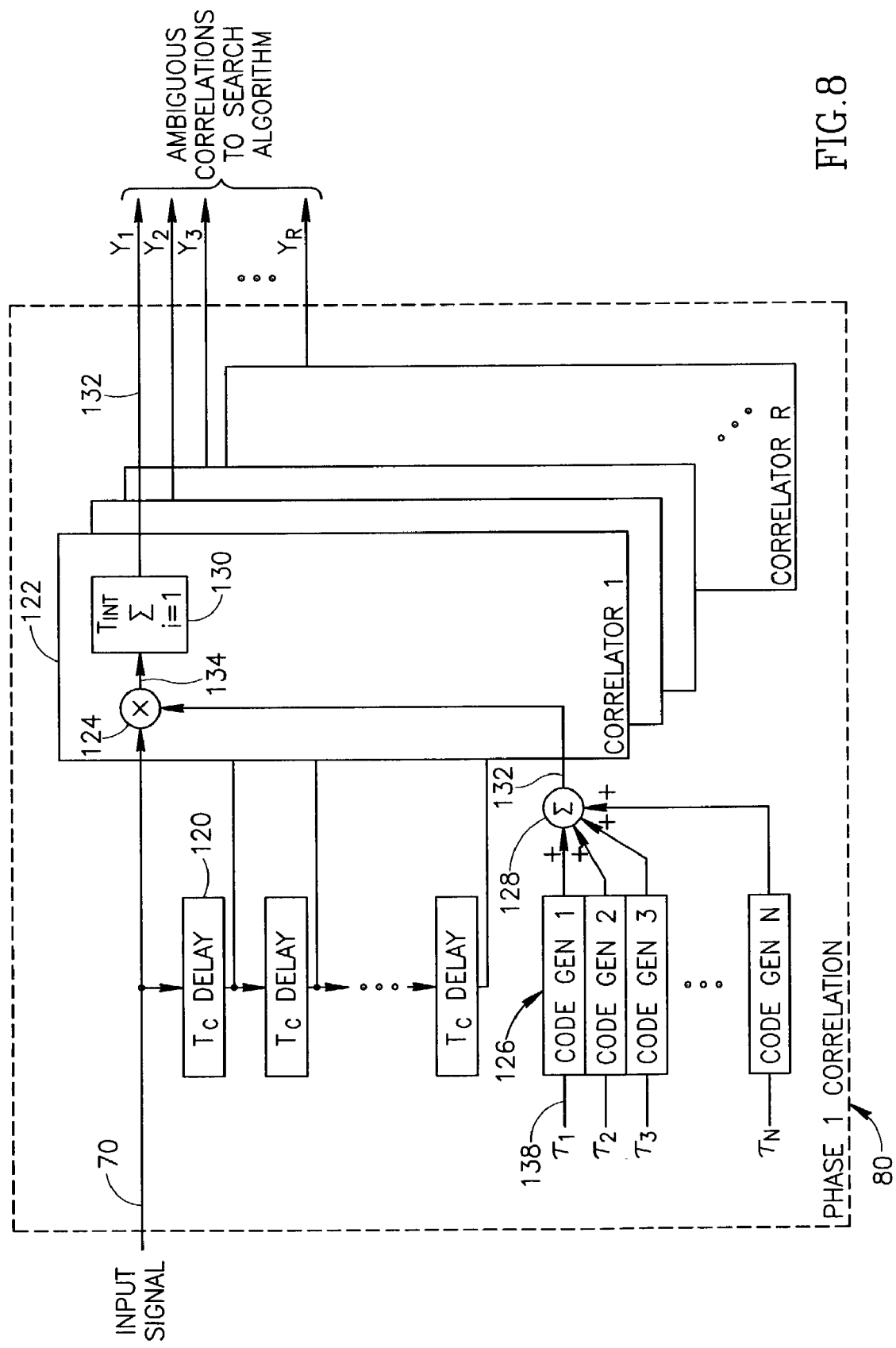
FIG. 8 is a block diagram illustrating an example embodiment of the phase 1 correlation machine of the present invention utilized to perform coarse (ambiguous) correlations.

Example implementations for the phase 1 and phase 2 correlation units will now be presented. A block diagram illustrating an example embodiment, of the phase 1 correlation machine of the present invention utilized to perform coarse (ambiguous) correlations is shown in FIG. 8. The correlation unit, generally referenced 80, comprises a hank of R correlators 122, N code generators 126 and R-1 delay units 120. The correlation unit 80 is adapted to perform R simultaneous correlations, in order to complete all the correlations required during phase 1, several passes arc required.

The N codes produced by the code generators are summed via summer 128 and the resulting code sum 132 is input to the multiplier 124 in each correlator 122. The codes may be produced by code generators or provided by an external host or other source. The phase (i.e. offset) τ 138 corresponding to each code is input to each generator. Note that depending on the application, the N codes may represent codes in a frequency hopping spread spectrum communication system.

In operation, the input signal 70 is input to the first correlator and to a tapped delay line, which functions to delay the input samples by the coarse resolution used in the phase 1 correlation, typically a whole chip period $T_C$. The delays are preferably uniform but, depending on the application, do not have to be. The bank of R correlators operate in parallel wherein each correlator is adapted to calculate the correlation of the incoming signal with a locally generated sum of N predefined codes each having a corresponding delay or offset. Thus, the phase 1 correlation generates N ×R correlation values spaced $T_C$ apart. The correlation results generated during phase 1 indicate the presence of a channel tap in an ambiguous manner. In accordance with suitable criteria, such as exceeding a threshold, the presence of a channel tap is determined without being able to associate die specific code corresponding to the detected channel tap. Example results of the phase 1 correlations are shown in FIG. 6 wherein each darkened column indicates the presence of a channel tap.

Each correlator comprises a multiplier 124 and an integrator 130, which functions to integrate the product 134 over an integration period. The results of the integration represent ambiguous correlations in that the individual code is unknown. The R integration results constitute the correlator output signal 132 $Y_1 \ldots Y_R$ subsequently input to the search algorithm 84 (FIG. 4).

Phase 2 Correlation Unit

Figure 9:
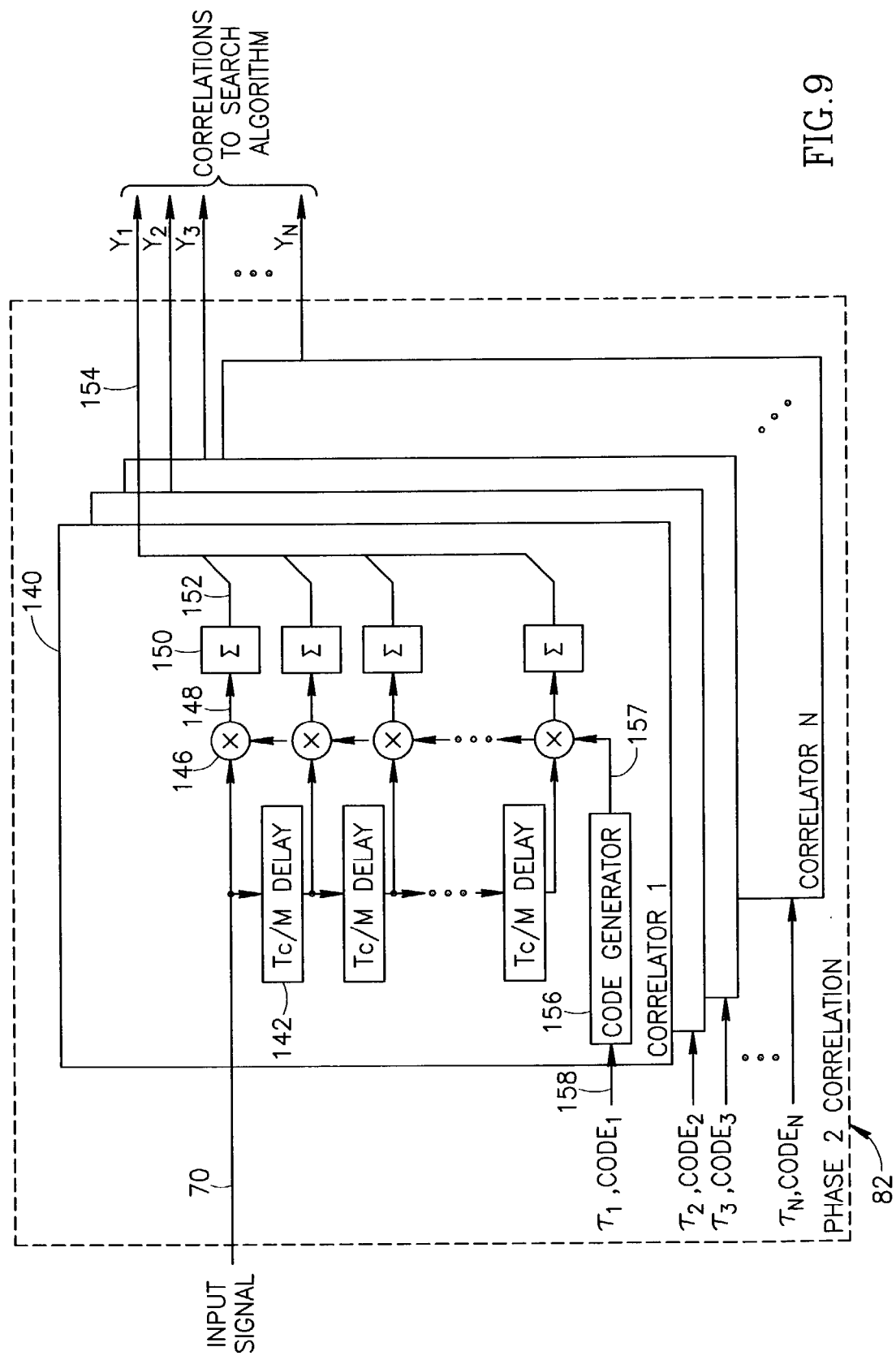
FIG. 9 is a block diagram illustrating an example embodiment of the phase 2 correlation machine of the present invention utilized to resolve the code ambiguity results obtained during phase 1 coarse correlations.

A block diagram illustrating an example embodiment of the phase 2 correlation machine of the present invention utilized to resolve the code ambiguity results obtained during phase 1 coarse correlations is shown in FIG. 9. The phase 2 correlator unit provides another parallel correlation calculation capability. The phase 2 correlation unit is adapted to perform correlation calculations for N different codes over several sub-chip delays simultaneously. After the completion of phase 2, the code ambiguity created in phase 1 is resolved and the channel tap delay estimate is fine tuned to the desired resolution.

The phase 2 correlation unit, generally referenced 82, comprises a bank of N correlators 140 each comprising a code generator 156, a plurality of delay units 142, multipliers 146 and integrators 150. A different code and offset pair 158 are input to the code generator in each correlator. The output 157 of each code generator is input to each of the multipliers. The input signal 70 is input to a tapped delay line wherein each delay 142 delays the signal by a sub-chip period $T_C/M$ where M denotes the fractional chip resolution, e.g., 4. Each of the multiplication results 148 are integrated over the integration period. The correlation results 152 are forwarded to the search algorithm via buses $Y_1$ to $Y_N$ 154. Example results of the phase 2 correlations are shown in FIG. 7 wherein each darkened square indicates the code and delay in sub-chip resolution associated with the channel tap.

In this example embodiment, the code generator is adapted to generate a single code at the desired offset. The code generators associated with the different correlators are normally not synchronized but are all clocked via the same chip clock. Note that as an alternative to the configuration shown, the output of the code generator may be delayed and the input signal applied in parallel to each multiplier. Depending on the implementation, it may be more efficient, in terms of hardware complexity, to delay the code rather than the input signal. Note also, that the delays 142 are preferably uniform, although they may not be depending on the application. In addition, the number of correlations performed by each correlation unit 140 may vary depending on the particular implementation and search algorithm.

It is noted that in the case where the same code sequence is used to generate the different codes wherein each code is generated using a different offset, τ is equivalent to the offset. In such a case, the code y-axis may be collapsed. Alternatively, the τ x-axis may be collapsed or a hybrid combination used.

Search Algorithm

With reference to FIG. 4, the correlation results of both phase 1 and phase 2 correlations are input to the channel tap estimate search algorithm and used in generating the output correlation results forwarded to the finger assignment unit, in accordance with the invention, the location of the channel taps in the code-delay domain is determined by appropriately switching between phase 1 and phase 2 correlations. Assuming the phase 1 correlation unit comprises R correlators, all the columns (i.e. coarse delays) in the search space are covered after P/R iterations of phase 1 (although the code within a column is not discernable in phase 1) where P is the delay range searched in units of $T_C$'s. Note that during phase 1, many of the delays scanned have a low a priori probability of having a channel tap present. Thus, a fast but rough search is performed. The search algorithm is adapted to initiate phase 1 correlation at a periodic rate via control signal 90. The integration time of the phase 1 correlation must be sufficient in duration to meet the desired detection performance.

The results of the phase 1 search indicate whether a channel tap exists within one or more N×R hypotheses tested during a single search operation (N is the number of codes). It is emphasized that N×P is a worst case for the initial state wherein in the steady state a search might be narrowed to non-existing tap delays since the existing taps are under tracking in terms of steady state operation. Each indication of phase 1, however, is ambiguous due to the summing of the codes. Therefore, the phase 2 correlations are performed in order to resolve the ambiguity. The correlations in phase 2 are configured to the previously detected taps. After the completion of phase 2, the channel taps and associated one of N codes can be detected. Assuming phase 1 results in Q most probable tap delay candidates, performing phase 2 Q times resolves the ambiguity introduced during phase 1 and results in a fully searched code-delay plain. A suitable search algorithm is able to reduce the task of searching (M·N·P) hypotheses to (P+M·Q) M−fractional sub-chip resolution operations of phase 1 and phase 2, respectively.

Alternately, phase 2 search correlations can be applied in such a manner as to first resolve the code ambiguity and only then resolve the fractional sub-chip resolution. Using this further modified approach; the number of correlations can be further reduced to (P+Q+FM), where F is the target number for 'found' multipath components.

In one embodiment, the search algorithm comprises a code-tracking loop 83 wherein phase 2 is executed periodically to track the estimates once they are initially generated. For example, the tracking loop may configure the phase 2 correlators to perform 'early,' 'on-time' and 'late' correlations with the input signal. The algorithm attempts to center the on-time correlation evenly between the early and late correlations. This can be achieved by examining for each correlation in phase 1 that exceeded a threshold, the correlation results at its two neighboring sub-chips positions. If the correlation in the center is on-time, the only significant signal will be on the detected chip. In response, phase 2 correlations are placed before and after the center one.

In the event of a non-symmetrical or off-center correlations, a best guess can be taken and the phase 2 correlations placed where the center most likely would be. Phase 2 may be called multiple times on an ongoing basis in order to adjust the delays for changes in the delay locations. This is accomplished by attempting to maintain centered peaks between the early and late correlations.

The design of the correlators used with the estimation mechanism of the present invention is not critical to its operation. Phase 1 and 2 correlators may be constructed having any desired capacity thus creating a tradeoff between the number of iterations of phase 1 and 2 versus the speed of operation. A correlator design suitable for use with the present invention is described in U.S. application Ser. No. 10/050,968, filed Jan. 22, 2002, entitled "Reduced Complexity Correlator For Use in a Code Division Multiple Access Spread Spectrum Receiver," similarly assigned and incorporated herein by reference in its entirety. Use of the correlator described therein provides a further reduction in receiver complexity.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of channel tap delay estimation of multipath components in an input signal for use in a spread spectrum communications system, said method comprising the steps of:

summing a plurality of codes to generate a code sum therefrom;

determining the delay associated with one or more multipath components within said input signal by performing a first set of correlations of said code sum with said input signal and delayed versions thereof;

determining the code associated with a multipath component by performing a second set of correlations of one or more delayed versions of said input signal with each of said plurality of codes, wherein one or more said delayed versions of said input signal are selected in accordance with the results of said first set of correlations; and declaring the existence of a multipath component at a delay and code in accordance with the second correlation results.

2. The method according to claim 1, wherein said plurality of codes comprise any combination of different codes or same codes with different offsets.

3. The method according to claim 1, wherein said first set of correlations are performed at a first search resolution and said second set of correlations are performed at a second search resolution, wherein said second search resolution is finer than said first search resolution.

4. The method according to claim 1, wherein said first set of correlations are performed at a chip delay spacing and said second set of correlations are performed at a fractional chip spacing.

5. The method according to claim 4, wherein said fraction chip spacing comprises ½ chip spacing.

6. The method according to claim 1, further comprising the step of periodically tracking one or more estimated multipath components in accordance with the results of a third set of correlations of the code corresponding thereto with a plurality of adjacently located delayed versions of said input signal centered around estimates of early and late versions of said input signal.

7. The method according to claim 1, wherein said first set of correlations and said second set or correlations are performed in accordance with a priori information.

8. The method according to claim 1, further comprising the step of utilizing channel tap related channel estimation information.

9. The method according to claim 1, adapted to be implemented in an Application Specific Integrated Circuit (ASIC).

10. The method according to claim 1, adapted to be implemented in a Field Programmable Gate Array (FPGA).

11. The method according to claim 1, adapted to be implemented partially in hardware and partially in software.

12. The method according to claim 1, wherein said set of first correlations arc performed on hard-limited versions of said input signal.

13. The method according to claim 1, wherein said spread spectrum communications system comprises a code division multiple access (CDMA) communication system.

14. The method according to claim 1, wherein the declaration of a multipath component at a delay and code is made in accordance with the second correlation results that exceed a threshold.

15. The method according to claim 1, wherein a number of candidate delays are selected From the results of the first set of correlations.

16. A method of channel tap delay estimation of multipath components in an input signal for use in a spread spectrum communications system, said method comprising the steps of: summing a plurality of codes to generate a code sum therefrom;
performing a first set of correlations of said code sum with said input signal wherein said first set of correlations are performed over a delay search area;
selecting one or more candidates from said first set of correlations based on a first criteria;
for each candidate, performing a second set of correlations of said input signal with each code; and
declaring the existence of a multipath component channel tap at a delay and code horn the results of said second set of correlations based on a second criteria.

17. The method according to claim 16, wherein said plurality of codes comprise any combination of different codes or same codes with different offsets.

18. The method according to claim 16, wherein said first set of correlations are performed at a first search resolution and said second set of correlations are performed at a second search resolution, wherein said second search resolution is finer than said first search resolution.

19. The method according to claim 16, wherein said first set of correlations are performed at a chip delay spacing and said second set of correlations are performed at a fractional chip spacing.

20. The method according to claim 19, wherein said fraction chip spacing comprises ½ chip spacing.

21. The method according to claim 16, wherein said delay search area covers a length of time at least the duration of expected multipath component delay spread.

22. The method according to claim 16, further comprising the step of periodically tracking one or more estimated multipath components in accordance with the results of a third set of correlations of the code corresponding thereto with a plurality of adjacently located delayed versions of said input signal centered around an estimate of an on-time delayed version of said input signal.

23. The method according to claim 16, adapted to be implemented in an Application Specific Integrated Circuit (ASIC).

24. The method according to claim 16, adapted to be implemented in a Field Programmable Gate Array (FPGA).

25. The method according to claim 16, adapted to be implemented partially in hardware and partially in software.

26. The method according to claim 16, wherein said set of first correlations are performed on hard-limited versions of said input signal.

27. The method according to claim 16, wherein said number of codes is non-fixed.

28. The method according to claim 16, wherein said spread spectrum communications system comprises a code division multiple access (CDMA) communication system.

29. The method according to claim 16, wherein said first criteria and said second criteria are based on thresholds.

30. The method according to claim 16, wherein said first criteria is based on selecting a fixed number or candidate results.

31. The method according to claim 16, wherein said second criteria is based on selecting a fixed number of candidate results.

32. A method of channel tap delay estimation of multipath components in an input signal for use in a spread spectrum communications system, said method comprising the steps of:
estimating the delays associate with a plurality of multipath components present in an input signal by performing a first set of correlations on said input signal and on delayed versions thereof with a sum of N codes the results of which indicate the presence of a multipath component at a particular delay having one of said N codes, wherein N is a positive integer; and
resolving the code ambiguity in the results of said estimating step by performing a second set of correlations of said input signal at the estimated multipath delays found during said estimating step with each of said N codes individually.

33. The method according to claim 32, wherein said step of estimating comprises the step of indicating the presence of a multipath component at a particular delay if a correlation result in said tint set of correlations corresponding thereto exceeds a single threshold or a set of thresholds wherein each threshold is associated with a different correlation result.

34. The method according to claim 32, wherein said step of resolving comprises the step of indicating the code associated with a particular multipath component if a correlation result in said second set of correlations exceeds a threshold.

35. The method according to claim 32, further comprising the step of periodically tracking said multipath components by attempting to maintain early, on-time and late correlations of said input signal arid the code corresponding to the particular multipath component.

36. The method according to claim 32, wherein the step of resolving comprises the step of fine-tuning the estimates of the delays found in said step of estimating.

37. The method according to claim 32, further comprising the step of performing said set of first correlations and said set of second correlations in a repeating manner so as to achieve a steady state balance whereby delays arid codes associated therewith are detected and tracked for a plurality of multipath components.

38. The method according to claim 32, adapted to be implemented in an Application Specific Integrated Circuit (ASIC).

39. The method according to claim 32, adapted to be implemented in a Field Programmable Gate Array (FPGA).

40. The method according to claim 32, adapted to be implemented partially in hardware and partially in software.

41. The method according to claim 32, wherein said set of first correlations are performed on hard-limited versions of said input signal.

42. The method according to claim 32, wherein spread spectrum communications system comprises a code division multiple access (CDMA) communication system.

43. An apparatus for estimating a channel tap delay of multipath components in an input signal for use in a spread spectrum communications system, comprising:
 code summing means for summing a plurality of N codes to generate a code sum therefrom, wherein N is a positive integer;
 first correlation means for determining the delay associated with one or more multipath components within said input signal by performing a first set of correlations of said code sum with said input signal and delayed versions thereof;
 second correlation means for determining the code associated with a multipath component by performing a second set of correlations of one or more delayed versions of said input signal with each of said N codes, wherein one or more said delayed versions of said input signal are selected in accordance with the results of said first set of correlations; and
 control means operative to declare the existence of a multipath component at a delay and code in accordance with second correlation results.

44. The apparatus according to claim 43, further comprising code tracking means operative to track said multipath components by attempting to maintain early, on-time and late correlations of said input signal and the code corresponding to the particular multipath component.

45. The apparatus according to claim 43, adapted to be implemented in an Application Specific Integrated Circuit (ASIC).

46. The apparatus according to claim 43, adapted to be implemented in a Field Programmable Gate Array (FPGA).

47. The apparatus according to claim 43, adapted to be implemented partially in hardware and partially in software.

48. The apparatus according to claim 43, wherein said set of first correlations are performed on hard-limited versions of said input signal.

49. The apparatus according to claim 43, wherein said number N is non-fixed.

50. The apparatus according to claim 43, wherein said plurality of N codes comprise any combination of diligent codes or same codes with different offsets.

51. The apparatus according to claim 43, wherein said spread spectrum communications system comprises a code division multiple access (CDMA) communication system.

52. A method of channel tap delay estimation of multipath components in an input signal (or use in a spread spectrum communications system, said method comprising the steps of:
 providing a correlation machine adapted In perform a plurality of correlations of an input signal and delayed version thereof and one or more codes;
 determining delays associated with said multipath components by configuring said correlation machine to perform a first set of correlations of said input signal and delayed versions thereof with a sum of a plurality of codes so as to generate indications of the presence of a multipath component at a particular delay having an ambiguous code associated therewith;
 resolving the ambiguity of the code associated with a multipath component by configuring said correlation machine to perform a second set of correlations of said input signal delayed in accordance with a determined multipath delay with each and every code in said plurality of codes, whereby correlations exceeding a threshold indicate the particular code associated with a multipath component; and
 tracking said multipath components by maintaining early, on-time and late correlations of said input signal with the code corresponding to the particular multipath component.

53. The method according to claim 52, adapted to be implemented in an Application Specific Integrated Circuit (ASIC).

54. The method according to claim 52, adapted to be implemented in a Field Programmable Gate Array (FPGA).

55. The method according to claim 52, adapted to be implemented partially in hardware and partially in software.

56. The method according to claim 52, wherein said set of first correlations are performed on hard-limited versions of said input signal.

57. The method according to claim 52, wherein said spread spectrum communications system comprises a code division multiple access (CDMA) communication system.

58. A rake receiver for use in a Code Division Multiple Access (CDMA) spread spectrum communications system, comprising:
 a radio frequency (RF) front end circuit for receiving a spread spectrum RF signal having a plurality of multipath components;
 a searcher adapted to estimate channel tap delays associated with the multipath components of said RF signal and to generate one or more path selections in accordance thereto, said searcher comprising means adapted to sum a plurality of N codes to generate a code sum therefrom, wherein N is a positive integer, determine the delay associated with one or more multipath components within said input signal by performing a first set of correlations of said code sum with said input signal and delayed versions thereof, determine the code associated with a multipath component by performing a second set of correlations of one or more delayed versions of said input signal with each of said N codes, wherein one or more said delayed versions of said input signal are selected in accordance with the results of said first set of correlations, declare the existence of a multipath component at a delay and code in accordance with the second correlation results;
 a finger bank for generating a plurality of demodulated signals from said RF signal in accordance with said path selections;
 a channel estimation unit adapted to generate channel estimates of one or more pilot signals; and
 a combiner coupled to the output of said collapsed finger bank and adapted to combine said demodulated signals output therefrom to generate a receive data output signal in accordance with said channel estimates.

59. The receiver according to claim 58, further comprising a channel decoder adapted to decode said receive data output signal and to generate a decoded output signal therefrom.

60. The receiver according to claim 58, Further comprising means for receiving and demodulating a plurality of physical channels concurrently.

61. The receiver according to claim 58, adapted to be implemented in an Application Specific Integrated Circuit (ASIC).

62. The receiver according to claim 58, adapted to be implemented in a Field Programmable Gate Array (FPGA).

63. The receiver according to claim 58, adapted to be implemented partially in hardware and partially in software.

64. The receiver according to claim 58, where said searcher is adapted to work during phase 1 correlation on hard-limited samples of said input signal.

65. The receiver according to claim 58, wherein said N codes represent codes in a frequency hopping spread spectrum communication system.

66. The receiver according to claim 58, wherein said plurality of N codes comprise any combination of different codes or same codes with different offsets.

* * * * *